(12) United States Patent
Ishikawa

(10) Patent No.: US 10,185,214 B2
(45) Date of Patent: Jan. 22, 2019

(54) PROJECTOR AND IMAGE DISPLAY METHOD INCLUDING A LIGHT SEPARATION OPTICAL SYSTEM

(71) Applicant: NEC Display Solutions, Ltd., Tokyo (JP)

(72) Inventor: Takashi Ishikawa, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 15/567,031

(22) PCT Filed: Apr. 17, 2015

(86) PCT No.: PCT/JP2015/061852
§ 371 (c)(1),
(2) Date: Oct. 16, 2017

(87) PCT Pub. No.: WO2016/166885
PCT Pub. Date: Oct. 20, 2016

(65) Prior Publication Data
US 2018/0095353 A1    Apr. 5, 2018

(51) Int. Cl.
G03B 21/20    (2006.01)
G03B 21/00    (2006.01)
G03B 33/12    (2006.01)

(52) U.S. Cl.
CPC ....... *G03B 21/2073* (2013.01); *G03B 21/006* (2013.01); *G03B 21/204* (2013.01); *G03B 21/2013* (2013.01); *G03B 33/12* (2013.01)

(58) Field of Classification Search
CPC .. G03B 21/2073; G03B 21/006; G03B 33/12; G03B 21/204; G03B 21/2013
See application file for complete search history.

(56) References Cited

U.S. PATENT DOCUMENTS 9,081,268 B2    7/2015  Sugiyama et al.
2012/0051044 A1*  3/2012  Akiyama ............... F21V 21/00
                                                362/233

(Continued)

FOREIGN PATENT DOCUMENTS

JP    2011-043597 A    3/2011
JP    2011-145681 A    7/2011
(Continued)

OTHER PUBLICATIONS

International Search Report (ISR) (PCT Form PCT/ISA/210), in PCT/JP2015/061852, dated Jul. 14, 2015.
(Continued)

*Primary Examiner* — Sultan Chowdhury
*Assistant Examiner* — Magda Cruz
(74) *Attorney, Agent, or Firm* — McGinn IP Law Group, PLLC.

(57) ABSTRACT

The present invention provides a projector with high brightness, the projector including: a first light source that outputs a first light containing a first fluorescence generated in a first fluorescence region; a second light source that outputs a second light containing a second fluorescence generated in a second fluorescence region; first to third image display elements; a light separation optical system that generates an illumination light illuminating the first to third image display elements with colors different from each other from the input first light and second light and radiates the illumination light to the first to third image display elements; and a controller that causes the first to third image display elements to display an image according to an input video signal and colors of the illumination light radiated to the first to third image display elements.

19 Claims, 14 Drawing Sheets

(56) References Cited

U.S. PATENT DOCUMENTS

| | | | | |
|---|---|---|---|---|
| 2012/0300178 | A1 | 11/2012 | Sugiyama et al. | |
| 2013/0010264 | A1* | 1/2013 | Takahashi et al. | G03B 21/14 353/20 |
| 2013/0107223 | A1* | 5/2013 | Toyooka | G03B 21/14 353/31 |
| 2014/0192331 | A1* | 7/2014 | Toyooka | G03B 21/006 353/85 |
| 2014/0232992 | A1* | 8/2014 | Egawa | G02B 27/48 353/30 |

FOREIGN PATENT DOCUMENTS

| | | |
|---|---|---|
| JP | 2012-123179 A | 6/2012 |
| JP | 2012-141495 A | 7/2012 |
| JP | 2012-203344 A | 10/2012 |
| JP | 2012-247491 A | 12/2012 |
| JP | 2014-106452 A | 6/2014 |
| JP | 2014-132288 A | 7/2014 |

OTHER PUBLICATIONS

Japanese Office Action dated Jun. 12, 2018, with an English translation thereof.

* cited by examiner

WAVELENGTH (nm)

PROJECTOR AND IMAGE DISPLAY METHOD INCLUDING A LIGHT SEPARATION OPTICAL SYSTEM

TECHNICAL FIELD

The present invention relates to a projector and an image display method.

BACKGROUND ART

Conventionally, a high-pressure mercury lamp and the like have been used as a light source of a projector. However, the lamp light source has a relatively short life and needs periodic replacement.

Thus, as a light source replacing the lamp light source, a projector having a light source using a fluorescent body is proposed.

Patent Literature 1 (JP2012-123179A) discloses a projector having a laser light source and a light source using a fluorescent body.

Projector 1 shown in FIG. 1 of Patent Literature 1 includes light source device 2, color separation optical system 3, liquid crystal light bulbs 4R, 4G, and 4B, color synthesizing element 5, and projection optical system 6. Light source 2 includes laser light source 9, dichroic mirror 10, ¼ wavelength plate 11, fluorescent body wheel 12, collimate optical system 13, lens arrays 14 and 15, polarization conversion element 16, and superimposing lens 17.

A p-polarized blue light emitted from laser light source 9 is transmitted through dichroic mirror 10 and ¼ wavelength plate 11 and enters fluorescent body wheel 12. The fluorescent body excited by the blue light emits yellow fluorescence and reflects a part of the incident blue light.

Therefore, a synthesized light of yellow fluorescence and the blue light is emitted as white light from fluorescent body wheel 12. The yellow fluorescence and the blue light enters ¼ wavelength plate 11. Since the yellow fluorescence is non-polarized (random polarization), no change occurs in the polarization.

On the other hand, a part of the blue light is converted from p-polarization to s-polarization by being transmitted through ¼ wavelength plate 11 twice. Since dichroic mirror 10 is constituted so that the blue p-polarized light is transmitted and the blue s-polarized light and the yellow light are reflected, the yellow fluorescence and the s-polarized blue light are reflected and enter collimate optical system 13. The white light, which is synthesized light of the yellow fluorescence and the blue light with divergence angles adjusted by the collimate optical system, is converted to a single polarization which uniformly illuminates liquid crystal light bulbs 4R, 4G, and 4B by a so-called integrator optical system made of lens arrays 14 and 15, polarization conversion element 16, and superimposing lens 17. The yellow fluorescence and the blue light are separated from the white light by color separation system 3, the yellow fluorescence is separated to a green light and a red light, and they are spectrally dispersed to three primary colors of the red color, the green color, and the blue color, they entering light bulbs 4R, 4G, and 4B, respectively. The light in each color spatially modulated by the light bulbs is synthesized by light synthesizing element 5 on the same optical axis and then, is enlarged/projected by projection optical system 6 to screen 7.

Patent Literature 2 (JP2012-141495A) discloses a projector that includes a light source using a laser light source and a fluorescent body and that has high brightness.

Light source device 100 illustrated in FIG. 1 of Patent Literature 2 includes first light source 10 and second light source 11 as excitation light emitting means. The excitation lights emitted from the respective light sources are synthesized and collected on fluorescent body 50A and thus, it excites fluorescent body 50A with power exceeding an excitation light when light source 10 or light source 11 is used singularly. As a result, fluorescent power reinforced than that in Patent Literature 1 is obtained, and a projector with high brightness can be realized.

CITATION LIST

Patent Literature

Patent Literature 1: JP2012-123179A
Patent Literature 2: JP2012-141495A

DISCLOSURE OF INVENTION

Technical Problem

As one of the methods for realizing a projector with high brightness, as disclosed in Patent Literature 2, there is a method of reinforcing power of an excitation light entering a fluorescent body wheel.

However, when power of the excitation light is reinforced, a heat generation amount of the fluorescent body increases, and quantum efficiency of the fluorescent body lowers and thus, the conversion efficiency from the excitation light to the fluorescence lowers. When the quantum efficiency of the fluorescent body lowers, a phenomenon called temperature quenching, in which energy converted to heat in the excitation light further increases and fluorescent power further decreases, occurs.

Therefore, characteristics of the fluorescent body and configuration of the fluorescent body wheel need to be considered in the excitation light power for realizing a projector with high brightness. In general, in order to reinforce the fluorescent power, it is necessary to increase laser output and also to improve cooling performances of the fluorescent body. Thus, a large-scale cooling mechanism for an excitation light source and the fluorescent body has been needed.

Moreover, in realizing a projector with high brightness by a light source using a fluorescent body, a color balance of red, green, and blue is a point requiring consideration. In order to express proper white, colors of red, green and blue which are the three primary colors of light need to be contained at a specific power ratio.

FIG. 1A illustrates an example of a spectrum of a white light source configured by a blue light of a laser light source which is an excitation light and a yellow fluorescence. A green color and a red color obtained from a general yellow fluorescent body have substantially the same power ratio at which a proper white is obtained, and as illustrated in FIG. 1B, a proper white light can be obtained by a color balance between a yellow fluorescence and a blue fluorescence.

That is, in order to reinforce brightness of a projector having a light source using the yellow fluorescent body, colors of red, green, and blue need to be reinforced at the same ratio. If a projector with high brightness is to be realized by reinforcing only green for a projector having the yellow fluorescent body as a light source, white points are biased in a green color region direction. In other words, red and blue for expressing a proper white becomes insufficient. As a result, a color balance of a projection screen is lost, and the projection screen displaying white is biased to green, which largely degrades image quality.

The present invention has an object to solve the aforementioned problem and to provide a projector with high brightness and an image display method.

Solution to Problem

A projector of the present invention includes:

a first light source that outputs a first light containing a first fluorescence generated in a first fluorescence region;

a second light source that outputs a second light containing a second fluorescence generated in a second fluorescence region;

first to third image display elements;

a light separation optical system that generates an illumination light illuminating the first to third image display elements with colors different from each other from the input first light and second light and radiates the illumination light to the first to third image display elements; and a controller that causes the first to third image display elements to display an image according to an input video signal and colors of the illumination light radiated to the first to third image display elements.

An image display method according to the present invention causes a first light containing a first fluorescence generated in a first fluorescence region to be output from a first light source;

causes a second light containing a second fluorescence generated in a second fluorescence region to be output from a second light source;

generates an illumination light illuminating the first to third image display elements with colors different from each other from the first light and second light;

causes the illumination light to be radiated to the first to third image display elements; and causes the first to third image display elements to display an image according to an input video signal and the illumination light.

DESCRIPTION OF EXAMPLE EMBODIMENTS

Next, example embodiments of the present invention will be described by referring to the attached drawings.

First Example Embodiment

Figure 2:
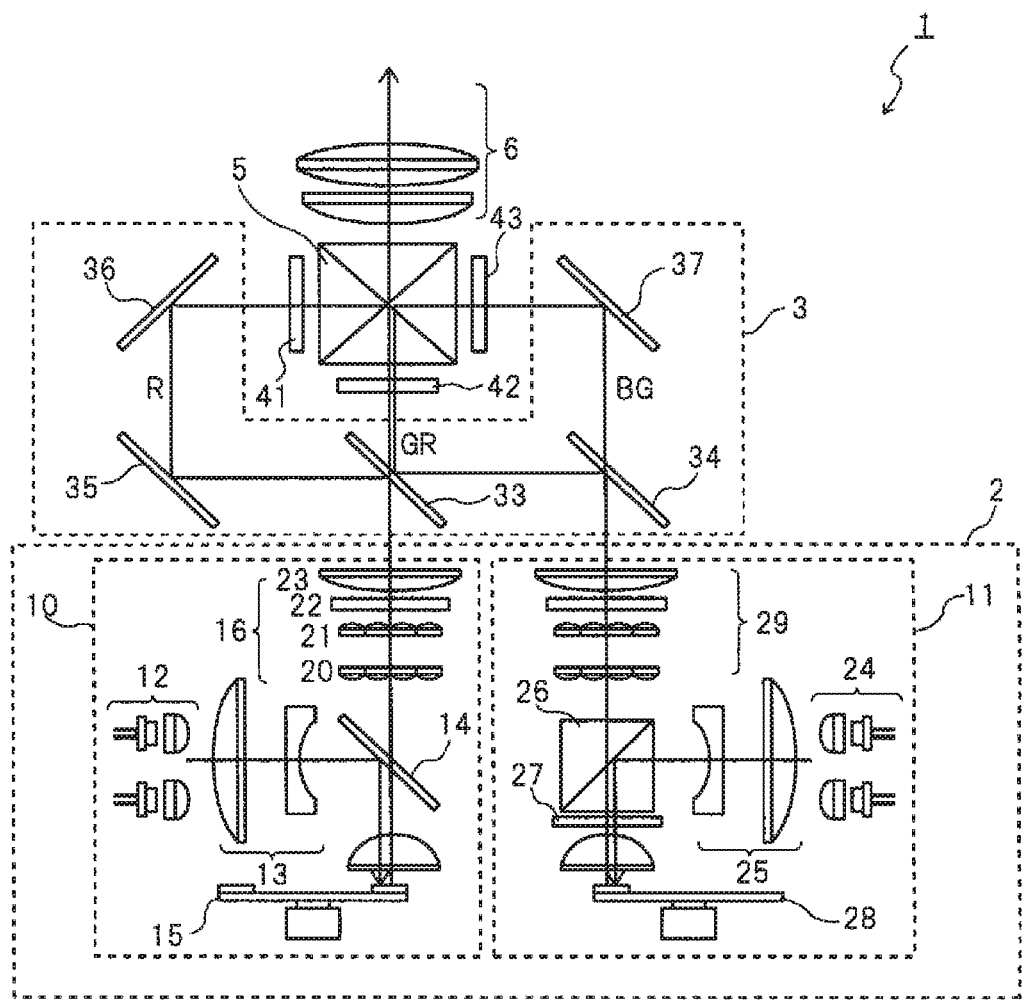
FIG. 2 is a schematic view for explaining configuration of an essential part of a first example embodiment of a projector according to the present invention.

FIG. 2 is a schematic view for explaining configuration of an essential part of a first example embodiment of a projector according to the present invention.

By referring to FIG. 2, projector 1 includes light source part 2, light separation optical system 3, display elements 41, 42, and 43, color synthesizing element 5, and projection optical system 6. In the projector, an image generating part which receives a video signal and causes display elements 41, 42, and 43 to perform display, a power source part, a cooling part and the like are provided in addition to the aforementioned optical system, but only an essential part of the optical system is illustrated in FIG. 2.

(Light Source Part)

Light source part 2 is constituted by first light source 10 and second light source 11.

(First Light Source)

First light source 10 includes laser light source 12, lens group 13, dichroic mirror 14, fluorescent body wheel 15, and illumination optical system 16. Other than the aforementioned constituent components, a lens or a mirror for an optical path adjustment is provided as necessary.

Figure 3A:
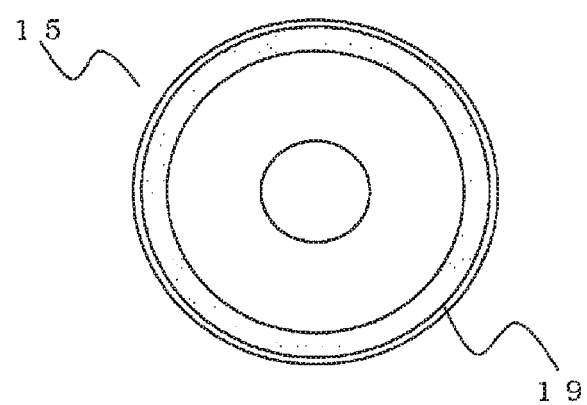
FIG. 3A is a plan view of fluorescent body wheel 15 constituting first light source 10 in FIG. 2.
Figure 3B:
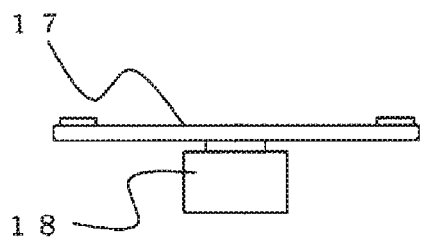
FIG. 3B is a side view of fluorescent body wheel 15 constituting first light source 10 in FIG. 2.

Fluorescent body wheel 15 includes disk-shaped substrate 17 and rotation motor 18 as illustrated in a plan view in FIG. 3A and a side view in FIG. 3B. On substrate 17, yellow fluorescent body 19 generating a yellow fluorescence is formed over the entire circumference.

A blue excitation light emitted from laser light source 12 has its flux diameter reduced by lens group 13 and then, enters dichroic mirror 14. Dichroic mirror 14 is constituted so as to reflect a light with a wavelength of the blue excitation light and transmits a light with a wavelength of yellow fluorescence generated by yellow fluorescent body 19. The blue excitation light reflected by dichroic mirror 14 is collected on fluorescent body wheel 15 and enters yellow fluorescent body 19.

Since substrate 17 is rotated by rotation motor 18, a spot position of the blue excitation light is swept in a circumferential direction of yellow fluorescent body 19. Yellow fluorescent body 19 is excited by the blue excitation light and then, emits a yellow fluorescence. The fluorescence emitted from fluorescent body wheel 15 is transmitted through dichroic mirror 14 and then enters illumination optical system 16.

Illumination optical system 16 includes lens arrays 20 and 21, polarization conversion element 22, and superimposing lens 23. The yellow fluorescence emitted from dichroic mirror 14 is split into a plurality of partial fluxes by first lens array 20. Second lens array 21 and superimposing lens 23 are constituted so as to converge the partial flux from first lens array 20 on display element which will be described later. The yellow fluorescence emitted from second lens array 21 is converted into yellow partial flux with s-polarization by polarization conversion element 22 and then passes through superimposing lens 23 and enters light separation optical system 3.

(Second Light Source)

Second light source 11 includes laser light source 24, lens group 25, prism 26, ¼ wavelength plate 27, fluorescent body wheel 28, and illumination optical system 29. Other than the aforementioned constituent components, a lens or a mirror for an optical path adjustment is provided as necessary.

Figure 3C:
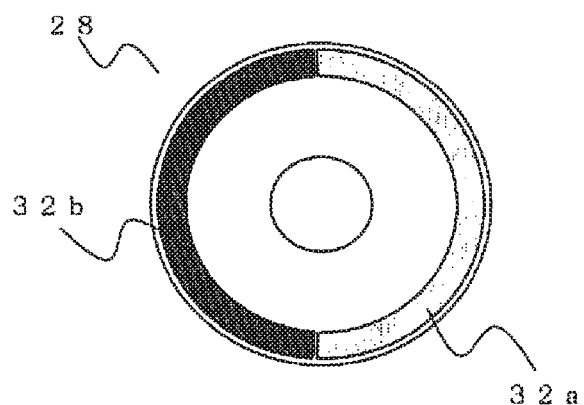
FIG. 3C is a plan view of fluorescent body wheel 28 constituting second light source 11 in FIG. 2.
Figure 3D:
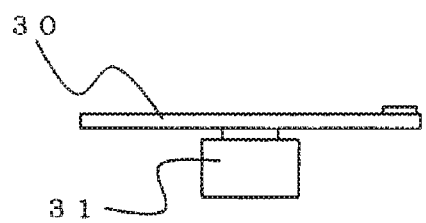
FIG. 3D is a side view of fluorescent body wheel 28 constituting second light source 11 in FIG. 2.

Fluorescent body wheel 28 includes disk-shaped substrate 30 and rotation motor 31 as illustrated in a plan view in FIG. 3C and a side view in FIG. 3D. Substrate 30 is split into a first segment and a second segment. On the first segment, yellow fluorescent body 32a that emits yellow fluorescence is formed, while on the second segment, reflection surface 32b is formed.

A blue excitation light emitted from laser light source 24 has its flux diameter reduced by lens group 25 and then enters prism 26. The blue excitation light is s-polarization with respect to an optical surface of prism 26. Prism 26 is constituted to reflect s-polarized light with a wavelength of the blue excitation light and transmit p-polarized light of the blue excitation light and light with a wavelength of the yellow florescence generated in yellow fluorescent body 32a. The blue excitation light reflected by prism 26 is transmitted through ¼ wavelength plate 27, is collected on fluorescent body wheel 28 and enters either yellow fluorescent body 32a or reflection surface 32b.

When the blue excitation light enters yellow fluorescent body 32a formed on the first segment, yellow fluorescent body 32a is excited by the excitation light, and yellow fluorescence is emitted in the direction of prism 26. When the blue excitation light enters reflection surface 32b formed on the second segment, reflection surface 32b reflects the blue excitation light in the direction of prism 26.

As described above, when the blue excitation light enters fluorescent body wheel 28, the yellow fluorescence and the blue excitation light according to the distribution ratio between the first segment and the second segment are emitted in the direction of prism 26. The distribution ratio between the first segment and the second segment is preferably adjusted so that the power ratio between the blue light and the yellow fluorescence is optimal in expressing a white.

The yellow fluorescence and the blue excitation light emitted from fluorescent body wheel 28 are transmitted through ¼ wavelength plate 27 and prism 26 and then enter illumination optical system 29. Here, the effect of ¼ wavelength plate 27 on the emitted light from fluorescent body wheel 28 will be explained. As described above, the blue excitation light emitted from laser light source 24 is s-polarization with respect to the optical surface of prism 26 and thus, it is reflected by prism 26 and when it is transmitted through ¼ wavelength plate 27, it is converted from the s-polarization to circular polarization. After that, if it is reflected by reflection surface 31b of fluorescent body wheel 28, it is transmitted through ¼ wavelength plate 27 again. At this time, the blue excitation light optically becomes equivalent to having been transmitted through a ½ wavelength plate, and a polarization axis is rotated by 90 degrees and converted to the p-polarization with respect to the optical surface of prism 26. Therefore, the blue excitation light reflected by reflection surface 32b is the p-polarization at entry to prism 26 and is transmitted through prism 26 and enters illumination optical system 29.

Since illumination optical system 29 has configuration similar to that of the illumination optical system of the first light source, its explanation is omitted but as a result, it is converted to partial fluxes of s-polarized yellow fluorescence and the blue excitation light and then enters light separation optical system 3.

(Light Separation Optical System)

Light separation optical system 3 includes first dichroic mirror 33, second dichroic mirror 34, and mirrors 35, 36, and 37. Other than the aforementioned constituent components, a lens or a mirror for an optical path adjustment is provided as necessary.

First dichroic mirror 33 is constituted to transmit light in a green wavelength region and to reflect light in a red wavelength region. As a result, the yellow fluorescence emitted from first light source 10 is separated by first dichroic mirror 33 to a green light and a red light (hereinafter referred to as a first green light and a first red light, respectively). More specifically, the first green light transmitted through first dichroic mirror 33 enters display element 42, while the first red light reflected by first dichroic mirror 33 is further reflected by mirrors 34 and 35 to enter display element 41.

Second dichroic mirror 34 is constituted to transmit lights in blue and green wavelength regions and to reflect light in the red wavelength region. The yellow fluorescence and the blue excitation light (hereinafter referred to as blue light) are emitted from second light source 11 in a time series, but the yellow fluorescence is separated to a green light (hereinafter referred to as a second green light) transmitted through second dichroic mirror 34 and a red light (hereinafter referred to as a second red light) reflected by second dichroic mirror 34, and the blue light is transmitted through second dichroic mirror 34.

If first dichroic mirror 33 has performance characteristics of transmitting the light in the blue wavelength region, first dichroic mirror 33 and second dichroic mirror 34 can be constituted by using the same components.

A reflection optical axis of second dichroic mirror 34 is arranged so as to match a reflection optical axis of first dichroic mirror 33. Therefore, the second red light reflected by second dichroic mirror 34 enters first dichroic mirror 33. Since first dichroic mirror 33 reflects the light in the red wavelength region, the second red light is synthesized on the same optical axis with the first green light and enters display element 42. The second green light and the blue light having been transmitted through second dichroic mirror 34 are reflected by mirror 36 and then enter display element 43 for blue in a time series.

(Display Element)

In this example embodiment, display elements 41, 42, and 43 are constituted by transmission-type liquid crystal light bulbs. Display elements 41, 42, and 43 include polarization plates, not shown, in front and in rear thereof and are arranged between light separation optical system 3 and light synthesizing optical element 5 and spatially modulate an illumination light in each color emitted from light separation optical system 3 and emit it as an image light in each color.

Light synthesizing element 5 is synthesizing means for synthesizing an image light in each color from display elements 41, 42, and 43, and a cross dichroic prism is used as light synthesizing element 5 in general.

(Light Synthesizing Element)

Figure 4:
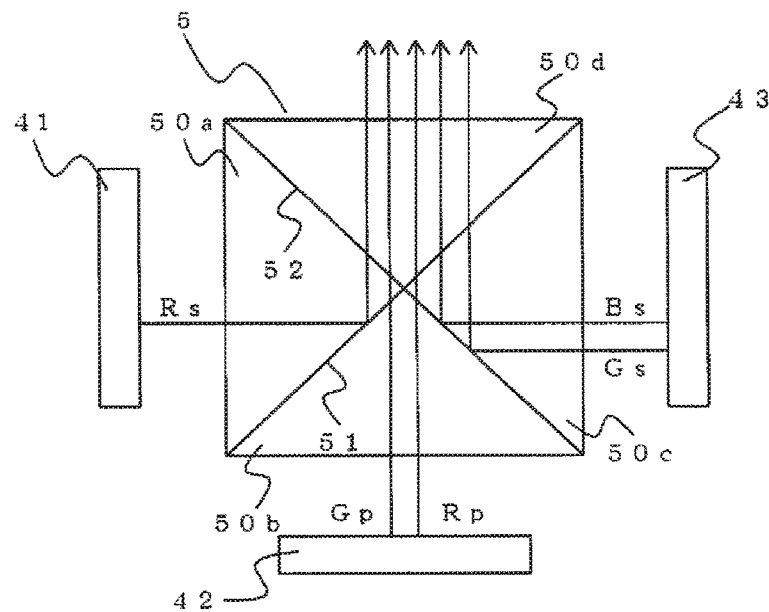
FIG. 4 is a schematic view for explaining configuration and an effect of light synthesizing element 5 in FIG. 2.

FIG. 4 is a schematic view for explaining configuration and an effect of light synthesizing element 5. Light synthesizing element 5 is constituted by four rectangular prisms 50*a*, 50*b*, 50*c*, and 50*d* whose surfaces forming a right angle are bonded to each other. Uniform first dichroic surface (RP surface) 51 is formed by a bonded surface between rectangular prisms 50*a* and 50*b* and a bonded surface between rectangular prisms 50*c* and 50*d*. Second dichroic surface (BR surface) 52 orthogonal to first dichroic surface 51 is formed by a bonded surface between rectangular prisms 50*a* and 50*d* and a bonded surface between prisms 50*b* and 50*c*.

First dichroic surface (RP surface) 51 has, with respect to the s-polarization, a characteristic of transmitting the light in blue and green wavelength regions and of reflecting the light in the red wavelength region and has, with respect to the p-polarization, a characteristic of transmitting at least the light in the red and green wavelength regions. Second dichroic surface (BR surface) 52 has, with respect to the s-polarization, a characteristic of reflecting the light in the blue and green wavelength regions and of transmitting the light in the red wavelength region and has, with respect to the p-polarization, a characteristic of transmitting at least the light in the red and green wavelength regions.

The image light by the first red light emitted from display element 41 is reflected by first dichroic surface 51 of light separation element 5, is transmitted through second dichroic surface 52 and enters projection optical system 6. The image light by the first green light and the image light by the second red light emitted from display element 42 are transmitted through first dichroic surface 51 and second dichroic surface 52 and enter projection optical system 6. The image light by the second green light and the image light by the blue light emitted from display element 43 are reflected by second dichroic surface 52, are transmitted through first dichroic surface 51 and enter projection optical system 6.

(Projection Optical System)

Projection optical system 6 enlarges/projects the image light in each color synthesized on the same optical axis to a screen, not shown, as a projection light.

(Control Method of First Example Embodiment)

Subsequently, a control method of the projector of this example embodiment will be explained.

Figure 5A:
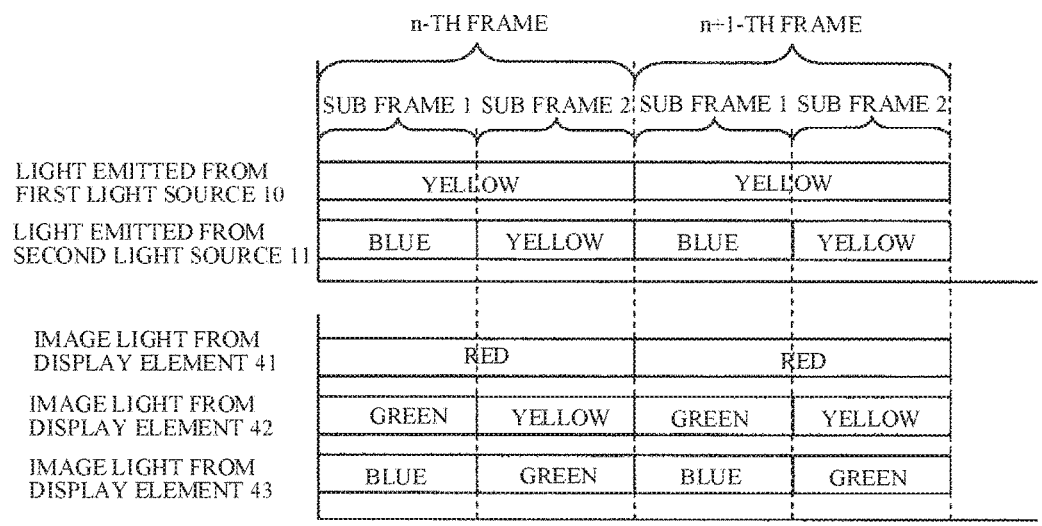
FIG. 5A is a view illustrating a relationship between colors of illumination lights emitted from first light source 10 and second light source 11 in FIG. 2 and colors of image lights emitted from display elements 41 to 43.

FIG. 5A is a view illustrating the relationship between the color of the illumination light emitted from first light source 10 and second light source 11 and the color of the image light emitted by display elements 41 to 43 in 1 frame during which fluorescent body wheels 15 and 28 make one rotation. Here, it is assumed that the segment of fluorescent body wheel 28 constituting second light source 11 is split into two parts of 180 degrees each, that is, a region where yellow fluorescent body 32*a* is formed and a region where reflection surface 32*b* is formed. In this case, assuming that a round of fluorescent body wheel is 1 frame, 1 frame period is equally divided into sub frame 1 and sub frame 2.

First light source 10 emits the yellow light at all times. On the other hand, second light source 11 emits the blue light in sub frame 1 and emits the yellow light in sub frame 2.

Subsequently, the illumination light entering display elements 41 to 43 will be explained. To display element 41, the first red light enters in both sub frames 1 and 2.

To display element 42, the first green light enters in both sub frames 1 and 2. In sub frame 2, since the second red light enters in addition to the first green light, the green light and the yellow light enter in time division as a result.

To display element 43, the second green light and the blue light enter in time division.

As a result of the above, in first sub frame, a red image light is emitted from display element 41, a green image light is emitted from display element 42, a blue image light is emitted from display element 43 for blue and after these image lights being synthesized by light synthesizing element 5, they are projected to the screen.

In second sub frame, the red image light is emitted from display element 41, a yellow image light is emitted from display element 42, and the green image light is emitted from display element 43 and after these image lights being synthesized by light synthesizing element 5, they are projected to the screen.

Figure 5B:
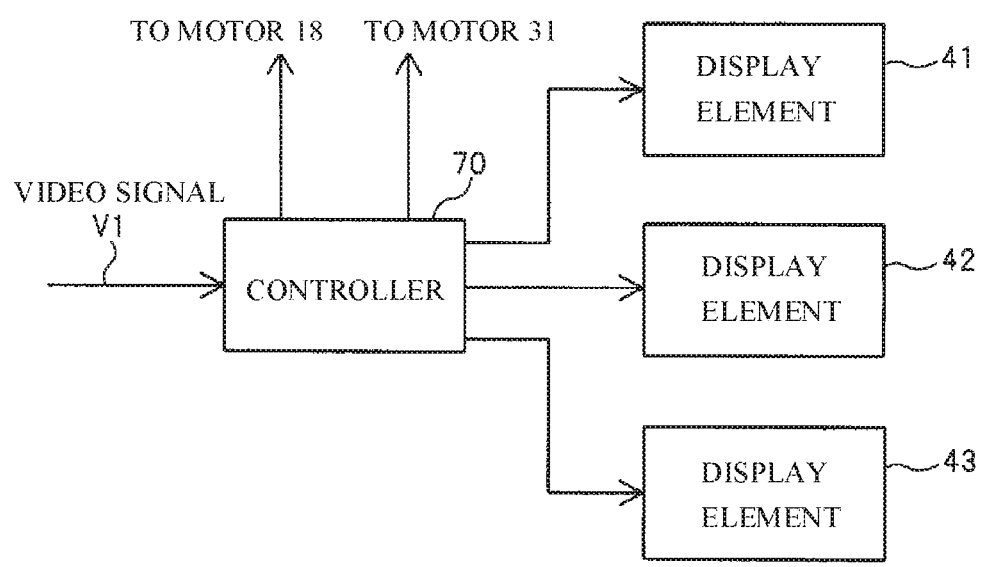
FIG. 5B is a block diagram illustrating configuration of an image generating part in a first example embodiment.

FIG. 5B is a block diagram illustrating configuration of the image generating part in this example embodiment.

Controller 70 controls rotating operations of motor 18 and motor 31 and supplies an image signal for causing display elements 41 to 43 to perform display. Controller 70 receives an input of a video signal V1 to be supplied to projector 1. Rotation control is executed for each of motors 18 and 31, and different image signals are supplied to display elements 41 to 43 in each of sub frame 1 and sub frame 2 generated by the rotation of motor 31.

To display element 41, an image signal causing an image for red to be displayed is supplied to both sub frames 1 and 2. To display element 42, an image signal causing an image for green to be displayed is supplied in sub frame 1, while an image signal causing an image for yellow to be displayed is supplied in sub frame 2. To display element 43, an image signal causing an image for blue to be displayed is supplied in sub frame 1, while an image signal causing an image for green to be displayed is supplied in sub frame 2.

According to the projector of the aforementioned example embodiment, a light amount is reinforced by adding fluorescence generated in different fluorescent bodies, respectively. Thus, since a temperature quenching phenomenon when power of excitation light is reinforced does not occur, red, green, and blue which are the three primary colors of light can be reinforced at the same ratio without requiring a large-scale cooling mechanism, and a projector with high brightness which can express proper white can be realized.

An effect of the projector of this example embodiment will be explained more specifically. As a comparison, brightness improvement by using a method of reinforcing excitation light power incident to the fluorescent body wheel as illustrated in Patent Literature 2 is considered. In this case, since strong excitation light enters the fluorescent body wheel, brightness of the fluorescence is lowered by temperature quenching of the fluorescent body. As a measure against this, reduction of temperature quenching by increasing a spot size of the excitation light so as to relax a local temperature rise on the fluorescent body can be considered.

However, if the spot size is increased, etendue of a light source defined by a light emitting area of the fluorescent body and a divergence angle of a light beam increases, and efficiency of the optical system lowers. Therefore, a spot size that can be increased has an upper limit. That is, even if the light source power incident to the single fluorescent body wheel is reinforced, improvement of brightness at the same ratio is extremely difficult.

Subsequently, cooling of the fluorescent body wheel is considered. When the single fluorescent body wheel is to be excited by a strong excitation light power, a local large heat amount needs to be efficiently discharged from the fluorescent body as cooling performances. However, when the fluorescent body wheel is used, cooling configuration which radiates heat from a substrate rotating at a high speed is needed, and since contact of a structure is impossible, an efficient radiation effect cannot be obtained easily. As a measure, an increase of a diameter of the fluorescent body wheel can be considered, but a cost increase for enlarging a component size or maintaining component stability cannot be avoided.

On the other hand, according to the projector of this example embodiment, the excitation light power incident to the fluorescent body wheel can be distributed to a plurality of fluorescent body wheels, and the excitation light power incident into a spot on one fluorescent body wheel does not increase. Therefore, the effect of higher brightness can be obtained without increasing etendue of the light source which is a fluorescent body light emitting part with respect to the increase of the excitation light power of the entire projector. Therefore, since the heat amount generated by temperature quenching lowers and a heat source can be made independent, heat can be radiated by using simple cooling configuration.

Moreover, when a spectral characteristic of a general yellow fluorescent body is considered, since green and red for expressing white can be reinforced at the same ratio, reproducibility of white can be maintained while the brightness is increased.

Second Example Embodiment

Subsequently, a second example embodiment according to the present invention will be explained.

Figure 6:
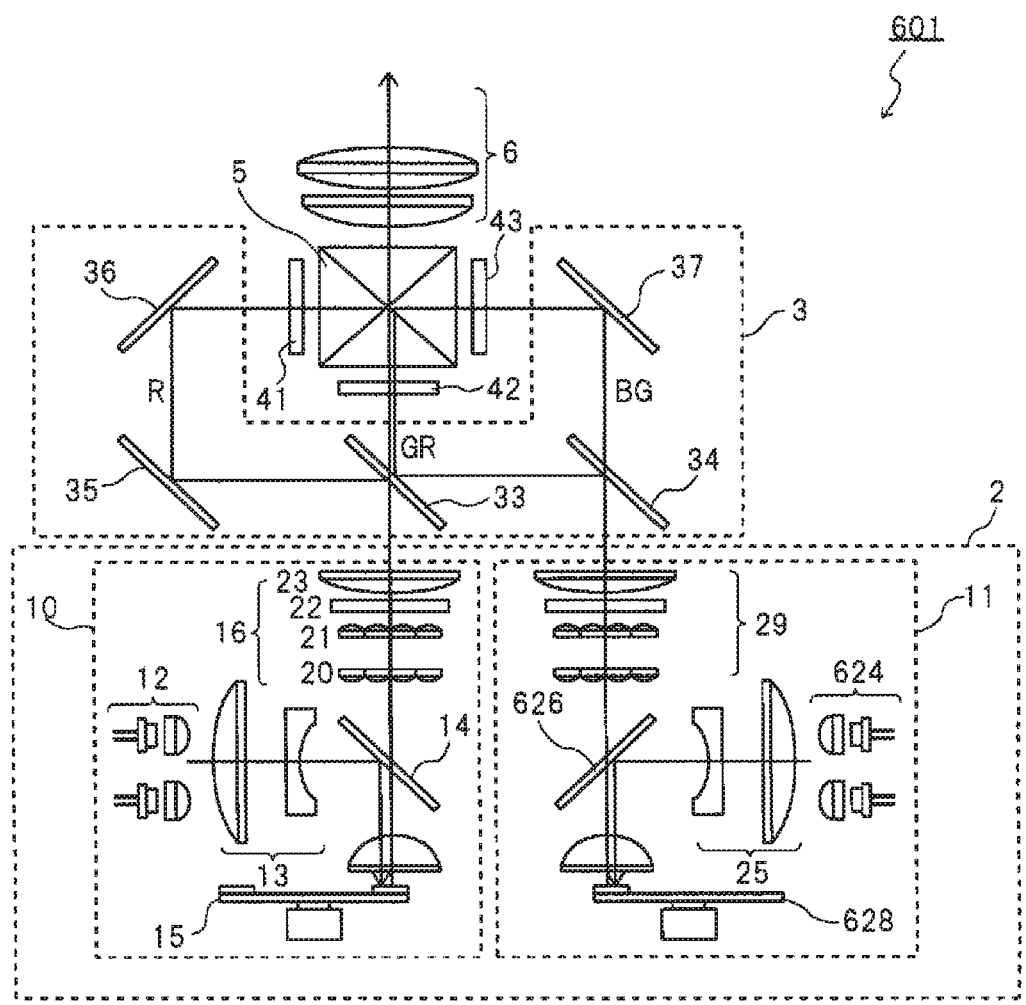
FIG. 6 is a schematic view for explaining configuration of an essential part of an optical system of a second example embodiment of the projector according to the present invention.

FIG. 6 is a schematic view for explaining configuration of an essential part of an optical system of the second example embodiment of the projector according to the present invention.

Figure 7:
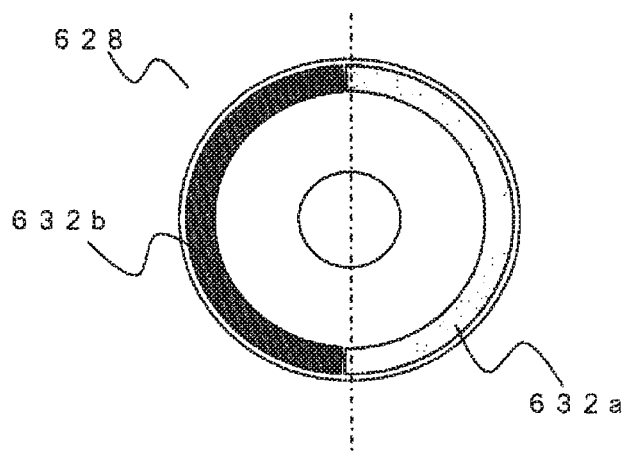
FIG. 7 is a plan view of fluorescent body wheel 628 constituting second light source 11 in FIG. 6.

In projector 601 of this example embodiment, laser light source 24 that outputs the blue excitation light in projector 1 illustrated in FIG. 2 is made laser light source 624 generating a blue-purple excitation light with a wavelength of 405 nm, dichroic mirror 626 is arranged instead of prism 26 and wavelength plate 27, and fluorescent body wheel 28 is made fluorescent body wheel 628 on which yellow fluorescent body 632a and blue fluorescent body 632b are formed, respectively, as illustrated in FIG. 7. Since other configurations are the same as projector 1 illustrated in FIG. 2, the same reference numerals as those in FIG. 2 are given, and the explanation will be omitted.

In this example embodiment, instead of prism 26 and wavelength plate 27, dichroic mirror 626 is arranged similarly to first light source 10. This dichroic mirror 626 is constituted to reflect the excitation light emitted by light source 624 and to transmit fluorescence emitted by fluorescent body wheel 628.

Since yellow fluorescent body 632a and blue fluorescent body 632b are formed on fluorescent body wheel 628, in this example embodiment, too, the yellow fluorescence is emitted from first light source 10 at all times, and the yellow fluorescence and the blue fluorescence are emitted from second light source 11 in time division similarly to the first example embodiment.

In this example embodiment, it is assumed that laser light source 624 generates the blue-purple excitation light with the wavelength of 405 nm, but this is not limiting. As laser light source 624, it is only necessary that lights generating yellow and blue are output by exciting yellow fluorescent body 632a and blue fluorescent body 632b formed on fluorescent wheel 628, respectively, and it may be those generating lights that have the wavelength of an ultraviolet region, for example.

Third Example Embodiment

Subsequently, a third example embodiment according to the present invention will be explained.

In both the first example embodiment illustrated in FIG. 2 and the second example embodiment illustrated in FIG. 6, the fluorescent body and the reflection plate provided in the annular region irradiated with the excitation light are formed by two segments equally dividing the ring and as a result, in both the first example embodiment and the second example embodiment, the generated sub frames are two sub frames having equal periods.

Figure 8:
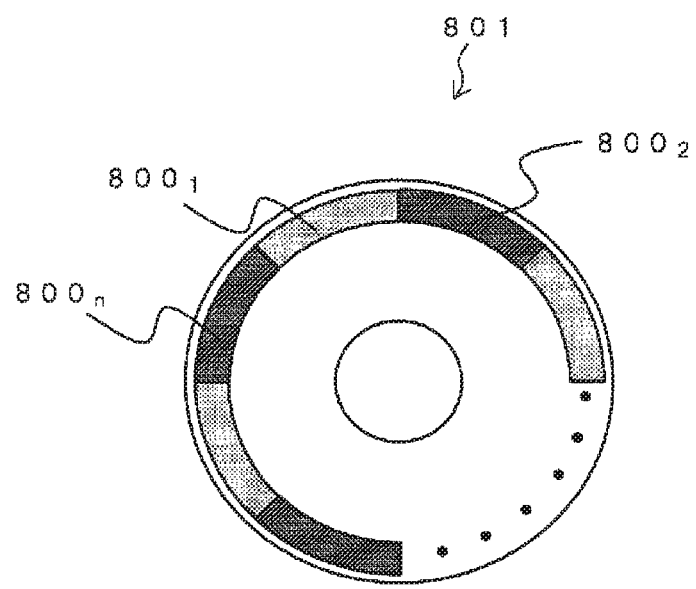
FIG. 8 is a plan view of fluorescent wheel 801 used in a third example embodiment of the projector according to the present invention.

In this example embodiment, as illustrated in a plan view in FIG. 8, an annular region of fluorescent wheel 801 provided on the second light source irradiated with an excitation light is equally divided into regions $800_1$ to $800_n$. In regions $800_1$ to $800_n$, a yellow fluorescent body and a reflection plate are provided alternately. Since an optical system in this example embodiment is similar to that in the first example embodiment, the explanation will be omitted.

In the case of this example embodiment, the number of sub frames is n pieces, and controller 70 illustrated in FIG. 5B switches an image displayed on display element 42 and display element 43 each time the sub frame is switched. In the case of this example embodiment, the number of sub frames generated in 1 frame increases, and color breaking is suppressed, whereby an image quality is improved.

Regions $800_1$ to $800_n$ may be so configured that the yellow fluorescent body and the blue fluorescent body are provided alternately, and the optical system is similar to that in the second example embodiment. In this case, similarly to the second example embodiment, the blue fluorescence and the yellow fluorescence are emitted alternately from second light source 11.

Fourth Example Embodiment

Subsequently, a fourth example embodiment of the present invention will be explained.

Figure 9:
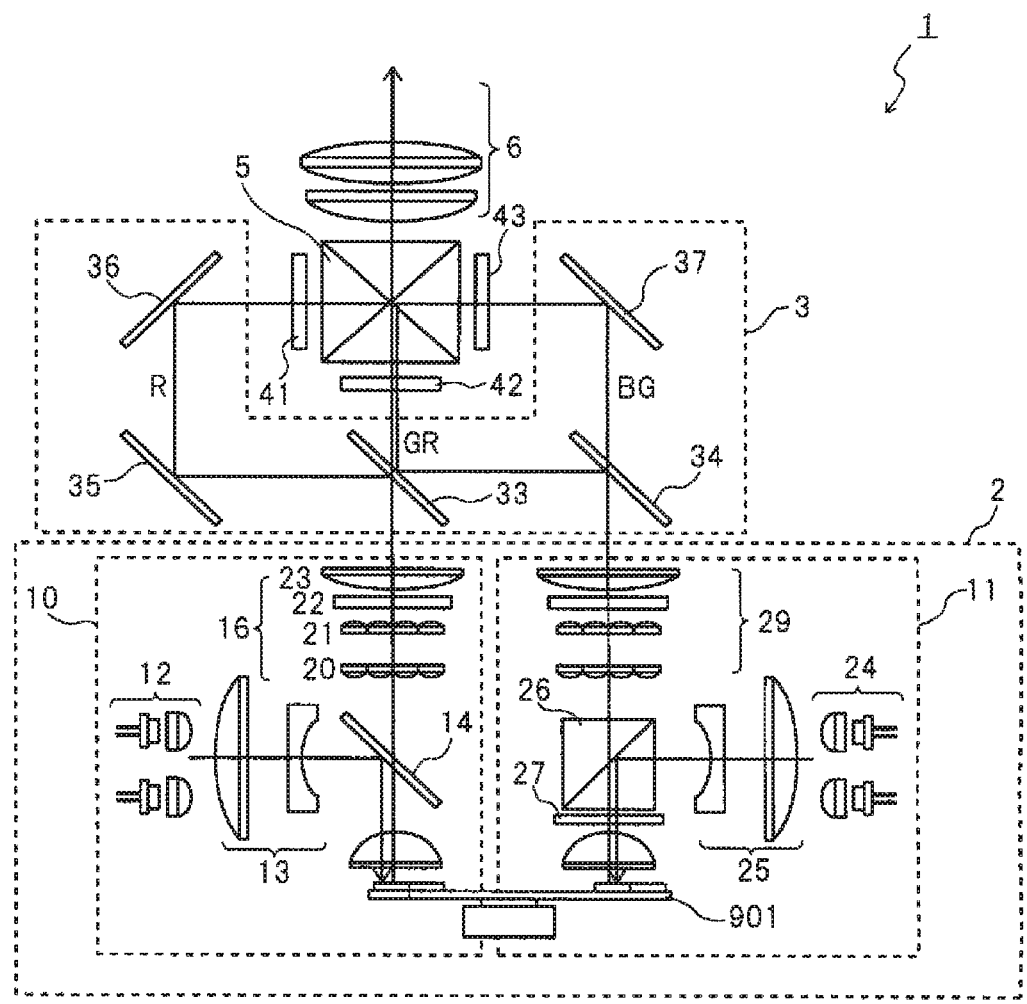
FIG. 9 is a view illustrating configuration of an essential part of a fourth example embodiment of the projector according to the present invention.

FIG. 9 is a view illustrating configuration of an essential part of the fourth example embodiment of the projector according to the present invention.

In each of the aforementioned example embodiments, fluorescent body wheels 15 and 18 are provided on first light source 10 and second light source 11, respectively, but in this example embodiment, one fluorescent wheel 901 is provided for first light source 10 and second light source 11. Since the other configurations are the same as projector 1 illustrated in FIG. 2, the same reference numerals as those in FIG. 2 are given, and the explanation will be omitted.

Figure 10:
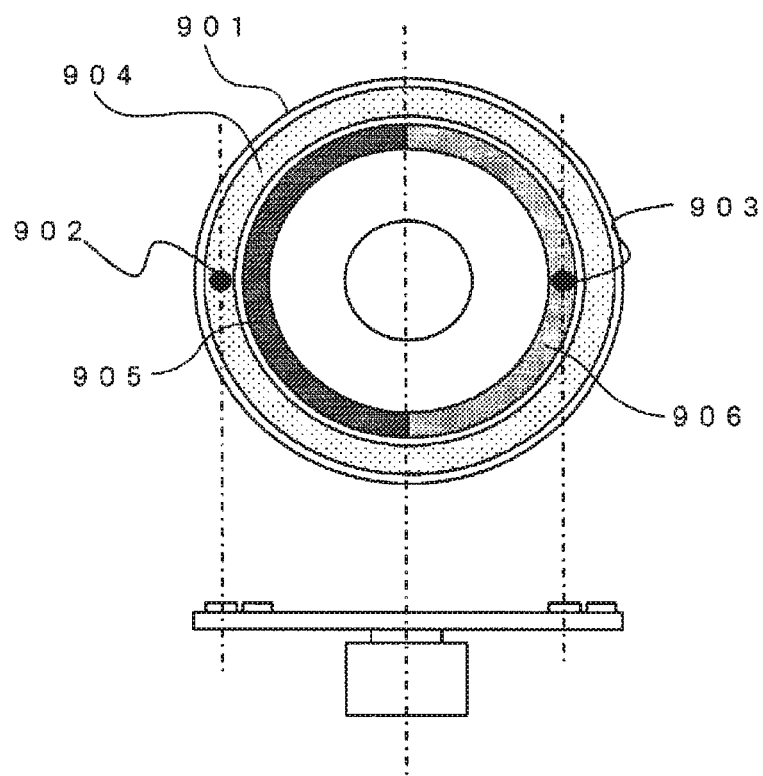
FIG. 10 is a plan view and a side view of fluorescent wheel 901 in FIG. 9.

Fluorescent wheel 901 includes, as illustrated in a plan view and a side view in FIG. 10, annular yellow fluorescent body 904 provided along an outer circumference and yellow fluorescent body 905 and reflection plate 906 provided on two segments obtained by equally dividing a ring inside yellow fluorescent body 904, respectively. Yellow fluorescent body 12 is irradiated with the excitation light from light source 12. Moreover, yellow fluorescent body 905 and reflection plate 906 are irradiated with the excitation light from light source 12.

In this example embodiment constituted as above, the yellow fluorescence is emitted from first light source 10 and the yellow fluorescence and the blue excitation light are alternately emitted from second light source 11 similarly to the first example embodiment. The optical system may be made similar to that in the second example embodiment. In this case, the blue fluorescence and the yellow fluorescence are alternately emitted from second light source 11 similarly to the second example embodiment.

Fifth Example Embodiment

Subsequently, a fifth example embodiment of the present invention will be explained.

In the first example embodiment illustrated in FIG. 2, second light source 11 emits the yellow fluorescence and the blue light in time division by using prism 26, ¼ wavelength plate 27, fluorescent body wheel 28 on which the yellow fluorescent body and the reflection plate are formed. On the other hand, in this example embodiment, a fluorescent wheel on which a segment transmitting the excitation light is formed is used and a form, in which the excitation light transmitted through the fluorescent wheel is folded back and is synthesized on the same optical axis with the fluorescence generated in the fluorescent body wheel, is provided.

Figure 11:
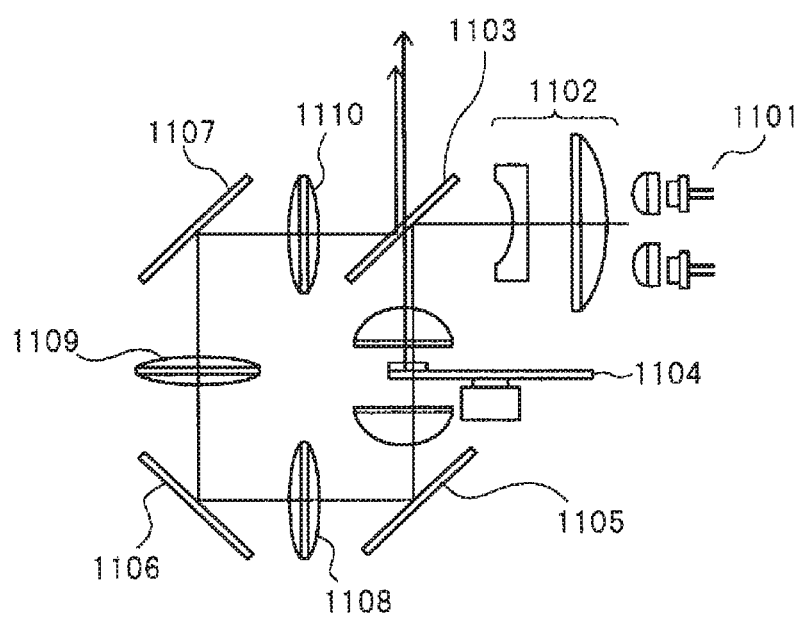
FIG. 11 is a view illustrating configuration of a second light source according to a fifth example embodiment of the present invention.

The configuration of the second light source according to this example embodiment is illustrated in FIG. 11. In this example embodiment, the configuration of second light source 11 used in the first example embodiment is made different. The configuration other than the second light source is similar to the optical system illustrated in FIG. 2 and thus, illustration is omitted, and only schematic configuration of an essential part of the second light source is illustrated in FIG. 11.

The second light source according to this example embodiment includes laser light source 1101, lens group 1102, dichroic mirror 1103, fluorescent wheel 1104, mirrors 1105 to 1107, and lenses 1108 to 1110. A blue excitation light emitted from laser light source 1101 has its flux diameter reduced by lens group 1102 and then enters dichroic mirror 1103. Dichroic mirror 1103 reflects the blue light and transmits the yellow light. Dichroic mirror 1103 reflects the excitation light from laser light source 1101 toward fluorescent wheel 1104.

On fluorescent wheel 1104, a first segment on which a fluorescent body that generates a yellow fluorescence by irradiation of the excitation light is provided and a second segment transmitting the excitation light are provided (neither of them is shown). The yellow fluorescence generated in fluorescent wheel 1104 passes through dichroic mirror 1103 and is emitted toward light separation optical system 3 (see FIG. 2), while the excitation light transmitted through fluorescent wheel 1104 passes through mirrors 1105 to 1107 and lenses 1108 to 1110 and then is reflected by dichroic mirror 1103 and is emitted toward light separation optical system 3.

The second light source according to this example embodiment, constituted as above, emits the yellow fluorescence and the excitation light in time series similarly to the second light source illustrated in FIG. 2.

In this example embodiment, since dichroic mirror 1103 which reflects the blue light is used, a component in which the blue excitation light is mixed with the yellow fluorescence can be completely removed as compared with the first example embodiment in which the reflection state of the blue light is controlled by using prism 26 and ¼ wavelength plate 27, and the color purity of the second green light becomes high.

Sixth Example Embodiment

Subsequently, a sixth example embodiment of the present invention will be explained.

Figure 12:
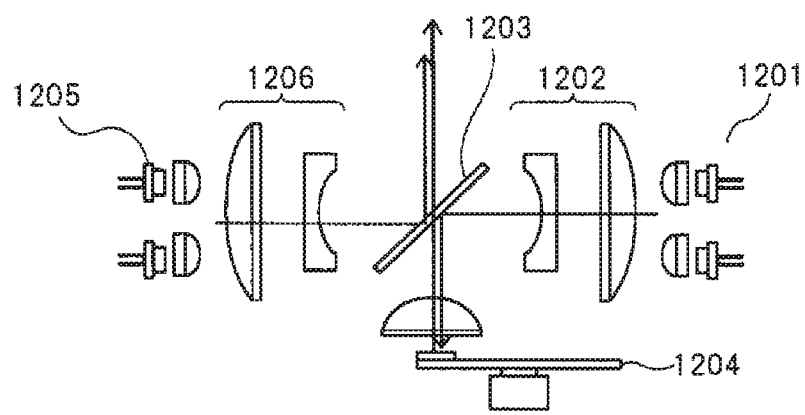
FIG. 12 is a view illustrating configuration of the second light source according to a sixth example embodiment of the present invention.

Configuration of the second light source according to this example embodiment is illustrated in FIG. 12. In this example embodiment, the configuration of second light source 11 used in the first example embodiment is made different similarly to the fifth example embodiment. Since the configuration other than the second light source is similar to the optical system illustrated in FIG. 2, illustration is omitted, and only schematic configuration of the essential part of the second light source is illustrated in FIG. 12.

This example embodiment includes a laser light source that outputs a blue light emitted to the light separation optical system other than the laser light source generating a light for excitation and as illustrated in FIG. 12. It includes laser light source 1201, lens groups 1202 and 1206, dichroic mirror 1203, and fluorescent wheel 1204.

The blue excitation light output by laser light source 1201 has its flux diameter reduced by lens group 1202 and then enters dichroic mirror 1203. Dichroic mirror 1203, which reflects the blue light and transmits a yellow light, reflects the excitation light from laser light source 1201 toward fluorescent wheel 1204. On fluorescent wheel 1204, a fluorescent body generating yellow fluorescence by irradiation of the excitation light is provided (not shown). The yellow fluorescence generated in fluorescent wheel 1204 passes through dichroic mirror 1203 and is emitted toward light separation optical system 3 (see FIG. 2).

Laser light source 1205 is provided at a position that faces with laser light source 1201 by sandwiching dichroic mirror 1203. The blue light emitted from laser light source 1205 has its flux diameter reduced by lens group 1206 and then is reflected by dichroic mirror 1203 and is synthesized on the same optical axis with the yellow light emitted from fluorescent body wheel 1204 and then is emitted toward light separation optical system 3.

In this example embodiment, there is no need to form a reflection surface or a transmission part on fluorescent body wheel 1204 and the same component as fluorescent body wheel 15 used for first light source 10 can be used. Moreover, by controlling an output state of laser light sources 1201 and 1205, the number of sub frames in 1 frame can be arbitrarily set, and there is no need to divide the fluorescent body provided on fluorescent wheel 1204 into a plurality of segments.

Seventh Example Embodiment

Subsequently, a seventh example embodiment of the present invention will be explained by referring to FIG. 13.

Figure 13:
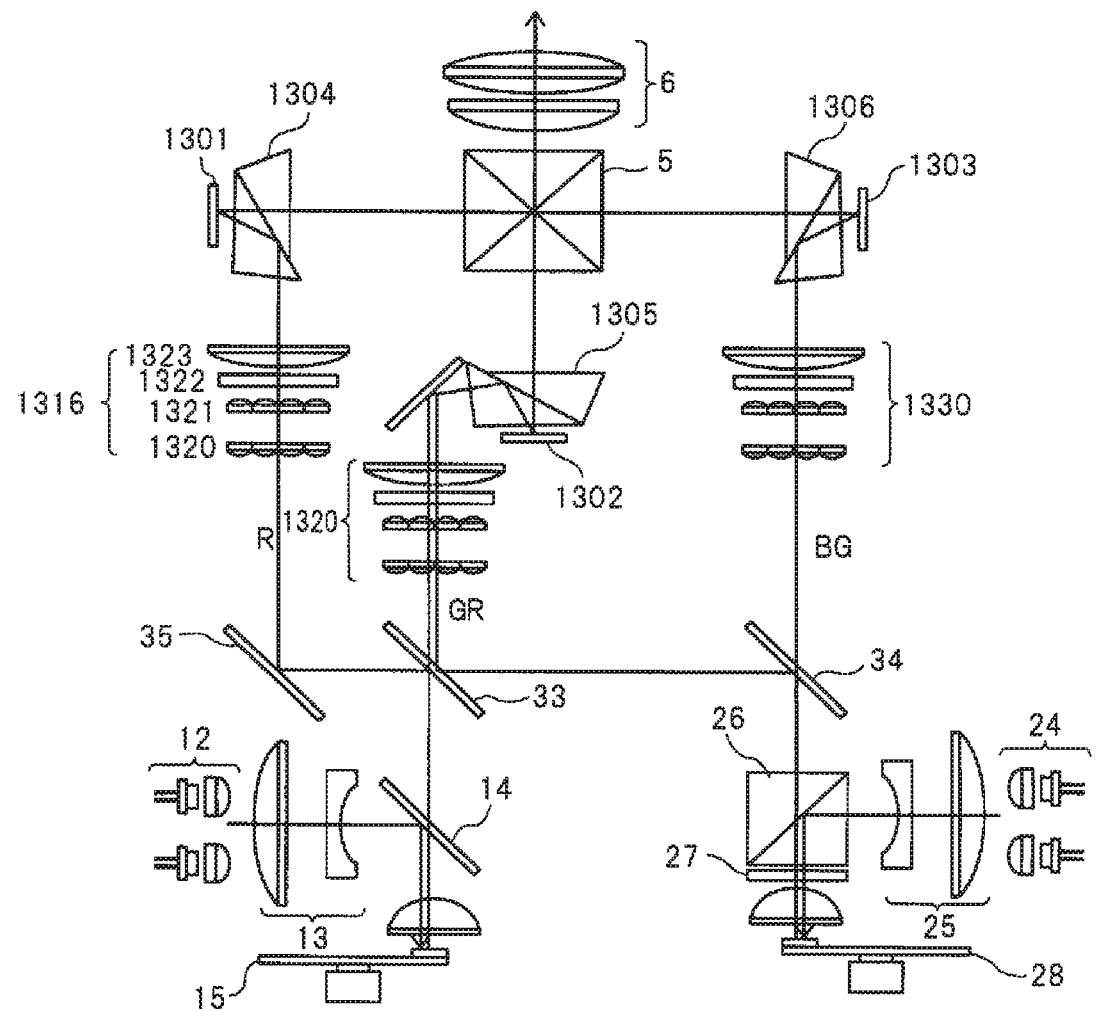
FIG. 13 is a schematic view for explaining configuration of an essential part of a seventh example embodiment of the projector according to the present invention.

FIG. 13 is a schematic view for explaining the configuration of an essential part of the seventh example embodiment of the projector according to the present invention.

In each of the aforementioned example embodiments, a transmission-type liquid crystal light bulb is used for generating an image light but the display element is not limited to that. For example, an LCOS (Liquid crystal on silicon) which is a reflection-type display element or a DMD (Digital Mirror Device) may be also used.

The example embodiment illustrated in FIG. 13 uses the DMD for the display element. Moreover, the illumination optical system provided in the first light source and the second light source is provided correspondingly to each of display elements.

Instead of display elements 41 to 43 used in the example embodiment illustrated in FIG. 2, DMD 1301 to 1303 and TIR (Total Internal Refection) prisms 1304 to 1306 are used in combination. To TIR prisms 1304 to 1306, the illumination light is incident through illumination optical systems 1316, 1320, and 1330. Since the other configurations are similar to the first example embodiment, the same reference numerals as those in FIG. 2 are given, and the explanation will be omitted.

Illumination optical system 1316 has lens arrays 1320 and 1321, polarization conversion element 3122, and superimposing lens 1323. The red light incident from mirror 35 is divided by first lens array 1320 into a plurality of partial fluxes. Second lens array 1321 and superimposing lens 1323 are constituted to converge the partial fluxes from first lens array 1320 on DMD 1301. The red light emitted from second lens array 1321 is converted by polarization conversion element 1322 to a red partial flux with s-polarization and then passes through superimposing lens 1323 and enters TIR prism 1304. After that, a red image light formed by being reflected by DMD 1301 passes through TIR prism 1304, is synthesized with image light of the other colors in light synthesizing element 5, and is projected by projection optical system 6.

The configurations of illumination optical systems 1320 and 1330 are also similar to illumination optical system 1316. In this example embodiment, color separation and color synthetization similar to the first example embodiment illustrated in FIG. 2 are executed in first dichroic mirror 33 and second dichroic mirror 34, and the green light and the yellow light obtained by them enter DMD 1302, and the blue light and the green light enter DMD 1303. Controller 70 illustrated in FIG. 5B causes an image, according to a color light incident to each DMD, to be displayed.

In the projector according to this example embodiment, too, image projection similar to the first example embodiment illustrated in FIG. 2 is performed. The DMD is used in this example embodiment, but the LCOS may be used as described above.

In this example embodiment, illumination optical systems 1316, 1320, and 1330 are provided correspondently to each of DMD 1301 to 1303. Thus, the illumination light can be converged on each of the display elements with accuracy, and brightness is improved in this point, too.

Eighth Example Embodiment

Subsequently, an eighth example embodiment of the present invention will be explained by referring to FIG. 14.

Figure 14:
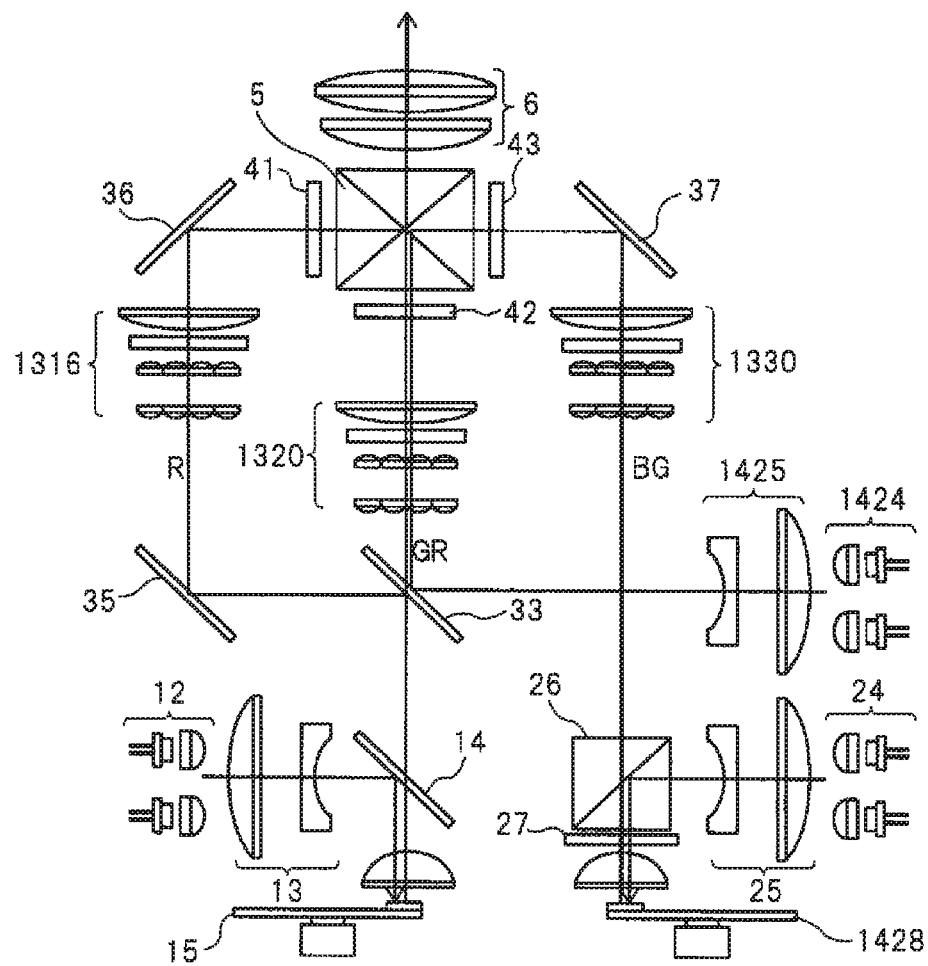
FIG. 14 is a schematic view for explaining configuration of an essential part of an eighth example embodiment of the projector according to the present invention.

FIG. 14 is a schematic view for explaining the configuration of an essential part of the eighth example embodiment of the projector according to the present invention.

In this example embodiment, laser light source 1424 outputting a red light as a third light source and lens group 1425 are provided in the sixth example embodiment illustrated in FIG. 13, and display elements 41 to 43 illustrated in FIG. 2 are used as the display elements. Moreover, as fluorescent wheel 1428 constituting the second light source, a first segment on which a fluorescent body generating a green fluorescence by irradiation of an excitation light is provided and a second segment on which a reflection plate which reflects the excitation light is formed are provided (neither of them is shown). Since the other constituent members are similar to those in the seventh example embodiment illustrated in FIG. 13, the same reference numerals as those in FIG. 13 are given, and the explanation will be omitted.

In this example embodiment, the second dichroic mirror is omitted. A green fluorescence and a blue excitation light sequentially generated in fluorescent wheel 1428 directly enter illumination optical system 1330 provided correspondingly to display element 43.

The red light emitted from laser light source 1424 has its flux system reduced by lens group 1425, and then is reflected by first dichroic mirror 33 toward display element 42.

The yellow fluorescence generated in fluorescent wheel 15 is separated by first dichroic mirror 33 into a green light and a red light. The green light is transmitted through first dichroic mirror 33 and goes toward display element 42, while the red light is reflected by first dichroic mirror 33 and goes toward display element 41 through mirrors 35 and 36. As a result, an image light illuminating each of image elements 41 and 42 becomes similar to that illustrated in FIG. 5A.

Ninth Example Embodiment

Subsequently, a ninth example embodiment of the present invention will be explained by referring to FIG. 15.

Figure 15:
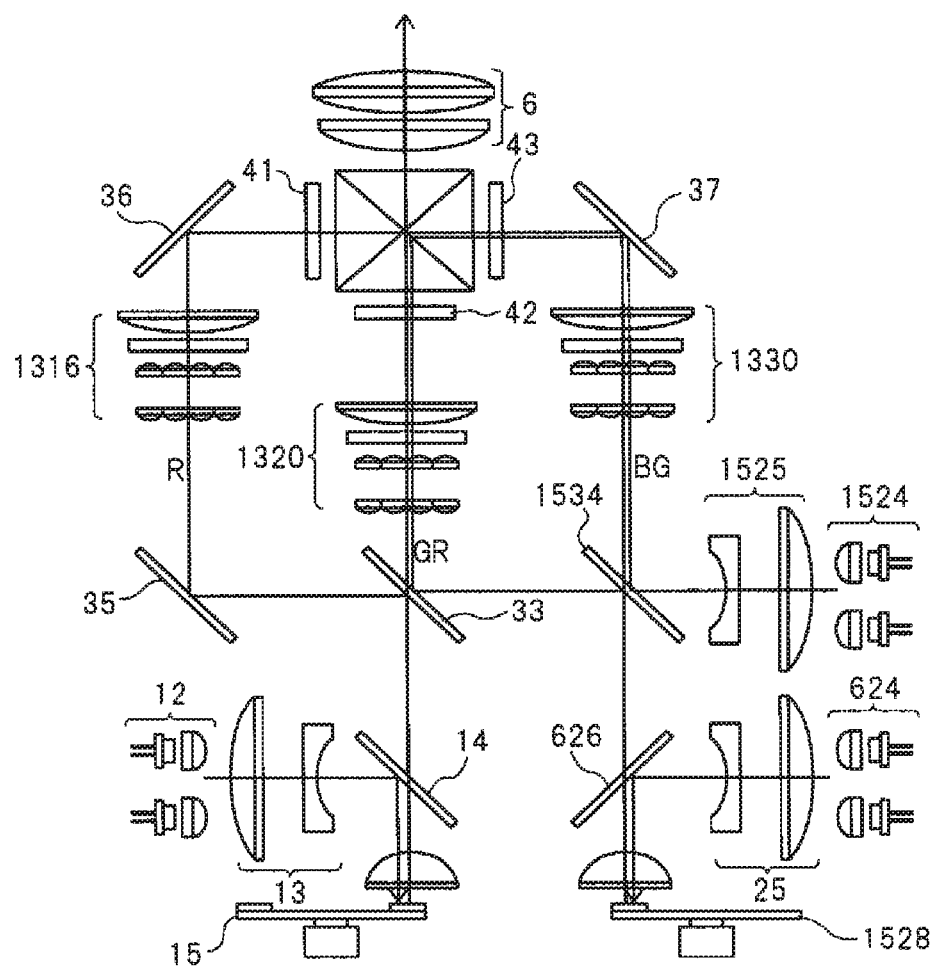
FIG. 15 is a schematic view for explaining configuration of an essential part of a ninth example embodiment of the projector according to the present invention.

FIG. 15 is a schematic view for explaining the configuration of an essential part of the ninth example embodiment of the projector according to the present invention.

In this example embodiment, instead of laser light source 1424 outputting the red light as the third light source and lens group 1425 in the seventh example embodiment illustrated in FIG. 14, laser light source 1524 outputting a blue light and lens group 1525 are provided, and second dichroic mirror 1534 is provided. As the laser light source, the lens group, and the dichroic mirror constituting the second light source, laser light source 624, lens group 25, and dichroic mirror 626 illustrated in FIG. 6 are used, and as the fluorescent body wheel, fluorescent wheel 1528, on which fluorescent bodies generating yellow fluorescence by blue-purple excitation light output by laser light source 624 are formed into a segment shape, is used. Since the other constituent members are similar to the eighth example embodiment illustrated in FIG. 14, the same reference numerals as those in FIG. 14 are given, and the explanation will be omitted.

In this example embodiment, second dichroic mirror 1534 functions as a so-called bandpass filter which reflect a blue light and a red light and transmits a green light.

The yellow fluorescence from fluorescent body wheel 1528 and the blue light from laser light source 1524 enter second dichroic mirror 1534. Laser light source 1524 is driven so that the blue light enters second dichroic mirror 1534 when it corresponds to sub frame 1 illustrated in FIG. 5A, and controller 70 illustrated in FIG. 5B drives a motor which rotates fluorescent body wheel 1528 so that the yellow fluorescence enters second dichroic mirror 1534 when it corresponds to sub frame 2 illustrated in FIG. 5A. As a result, the image light illuminating each of image elements 41 and 42 becomes similar to that illustrated in FIG. 5A.

Figure 1A:
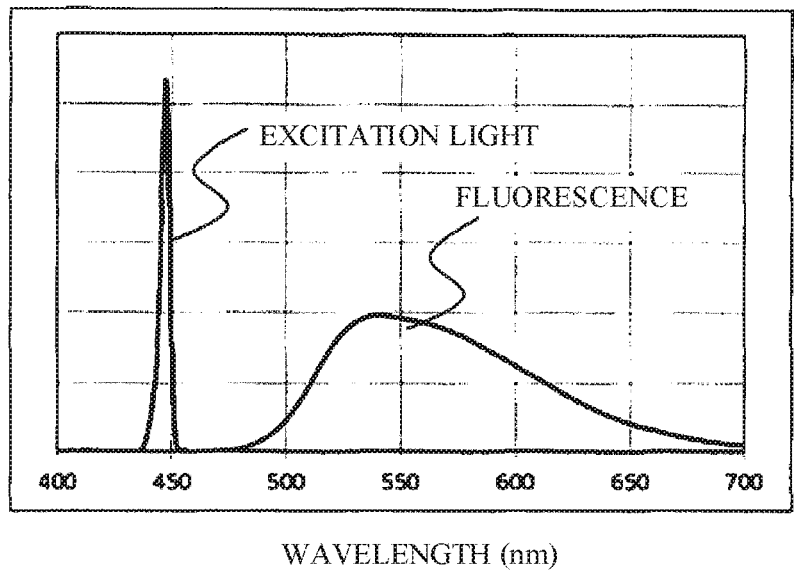
FIG. 1A is a schematic view of spectrums of a laser light source and a yellow fluorescence.
Figure 1B:
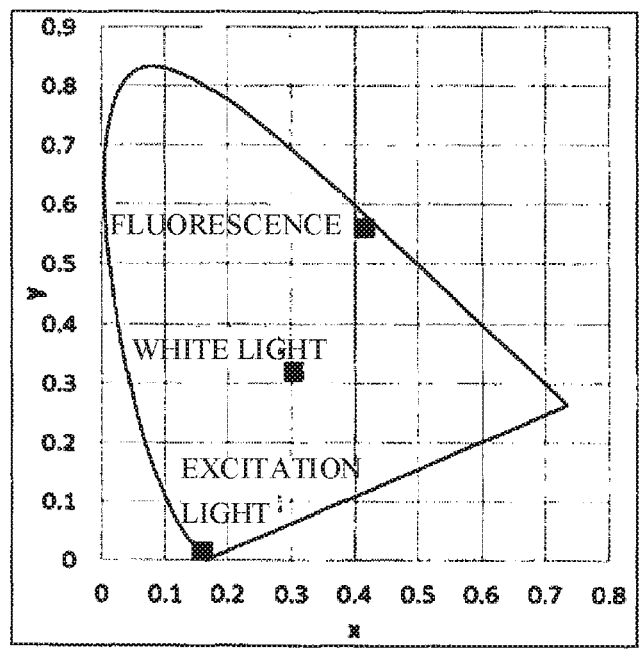
FIG. 1B is a schematic view of chromaticity points of the laser light source, the yellow fluorescence body, and of a white light source using it.

In the eighth example embodiment illustrated in FIG. 14 and the ninth example embodiment illustrated in FIG. 15, other than the light generated in the fluorescent body wheel, a red or blue light source is used as the third light source for the illumination light. By adjusting the output, an effect in which a white light illustrated in FIG. 1B can be easily realized is obtained.

In any one of the aforementioned example embodiments, the case where the first light source and the second light source are assumed to be one, respectively, and two fluorescent wheels are used was explained but the configuration of the present invention is not limited to that. It may be so constituted that the first light source including the fluorescent wheel and the second light source including the fluorescent wheel are provided in plural, and an output light is collected by a light collector and is output to the light separation optical system. At this time, as in the first to sixth example embodiments, when a polarization state needs to be kept, it is only necessary to use a light collector such as an optical fiber or a waveguide whose function is to keep a polarization plane. By using such configuration, the intensity of the illumination light can be further reinforced without generating temperature quenching of the fluorescent body.

It is needless to say that the constituent elements illustrated in each of the aforementioned example embodiments may be combined. For example, the illumination optical system provided in the first light source and second light source in the first to sixth example embodiments may be provided correspondingly to the display element including DMD and LCOS as illustrated in the seventh to ninth example embodiments, and the present invention includes a form in which the constituent elements of each of the example embodiments are combined.

Moreover, the present invention can take various forms as in the following SUPPLEMENTARY NOTES 1 to 10 but is not limited to these forms.

[Supplementary Note 1]

A projector including:
a first light source that outputs a first light containing a first fluorescence generated in a first fluorescence region;
a second light source that outputs a second light containing a second fluorescence generated in a second fluorescence region;
first to third image display elements;
a light separation optical system that generates an illumination light illuminating the first to third image display elements with colors different from each other from the input first light and second light and radiates the illumination light to the first to third image display elements; and
a controller that causes the first to third image display elements to display an image according to an input video signal and colors of the illumination light radiated to the first to third image display elements.

[Supplementary Note 2]

The projector described in SUPPLEMENTARY NOTE 1, in which at least either the first fluorescence or second fluorescence is a mixed color light that includes two color components in the colors of the illumination light generated by the separation optical system.

[Supplementary Note 3]

The projector described in SUPPLEMENTARY NOTE 1 or 2, in which the first fluorescence region is provided on a first fluorescent wheel and the second fluorescence region is provided on a second fluorescent wheel.

[Supplementary Note 4]

The projector described in SUPPLEMENTARY NOTE 1 or 2, in which the first fluorescence region and the second fluorescence region are provided on the fluorescent wheel provided in common on the first light source and the second light source.

[Supplementary Note 5]

The projector described in any one of SUPPLEMENTARY NOTES 1 to 4, further including a third light source that outputs a light in any one of the colors of the illumination light generated by the light separation optical system to the separation optical system.

[Supplementary Note 6]

The projector described in any one of SUPPLEMENTARY NOTES 1 to 5, further including first to third illumination optical systems which are provided between the first to third image display elements and the light separation optical system and converge the illumination light from the separation optical system on the first to third image display elements.

[Supplementary Note 7]

The projector described in any one of SUPPLEMENTARY NOTES 1 to 6, in which the first to third image display elements are transmission-type liquid crystal light bulbs.

[Supplementary Note 8]

The projector described in any one of SUPPLEMENTARY NOTES 1 to 6, in which the first to third image display elements are DMDs.

[Supplementary Note 9]

The projector described in any one of SUPPLEMENTARY NOTES 1 to 6, in which the first to third image display elements are LCOS.

[Supplementary Note 10]

An image display method in which a first light containing a first fluorescence generated in a first fluorescence region is output from a first light source;
a second light containing a second fluorescence generated in a second fluorescence region is output from a second light source;
an illumination light illuminating the first to third image display elements with colors different from each other is generated from the first light and second light;
the illumination light is radiated to the first to third image display elements; and
the first to third image display elements are caused to display an image according to an input video signal and the illumination light.

DESCRIPTION OF REFERENCE NUMERALS 1 projector
2 light source part
3 light separation optical system
5 color synthesizing element
6 projection optical system
41 to 43 display element

The invention claimed is:
1. A projector comprising:
a first light source that outputs a first light containing a first fluorescence generated in a first fluorescence region;
a second light source that sequentially outputs a second light and a third light whose wavelength is different from that of the second light, the second light containing a second fluorescence generated in a second fluorescence region;

first to third image display elements;

a light separation optical system that generates, from the first light, the second light and the third light that are input, an illumination light illuminating said first to third image display elements with colors different from each other and that radiates the illumination light to said first to third image display elements; and a controller that causes said first to third image display elements to display an image according to an input video signal and colors of the illumination light radiated to said first to third image display elements.

2. The projector according to claim 1, wherein at least either the first fluorescence or the second fluorescence comprises a mixed color light that includes two color components in the colors of the illumination light generated by said light separation optical system.

3. The projector according to claim 1, wherein the first fluorescence region is provided on a first fluorescent wheel and the second fluorescence region is provided on a second fluorescent wheel.

4. The projector according to claim 1, wherein the first fluorescence region and the second fluorescence region are provided on a fluorescent wheel provided in common on said first light source and said second light source.

5. The projector according to claim 1, further comprising:

first to third illumination optical systems which are provided between said first to third image display elements and said light separation optical system and converge the illumination light from said light separation optical system on said first to third image display elements.

6. The projector according to claim 1, wherein said first to third image display elements comprise transmission-type liquid crystal light bulbs.

7. The projector according to claim 1, wherein said first to third image display elements comprise DMDs.

8. The projector according to claim 1, wherein said first to third image display elements comprise LCOS.

9. An image display method comprising:

causing a first light containing a first fluorescence generated in a first fluorescence region to be output from a first light source;

causing a second light containing a second fluorescence generated in a second fluorescence region and a third light whose wavelength is different from that of the second light to be sequentially output from a second light source;

generating, from the first light, the second light and the third light, an illumination light illuminating said first to third image display elements with colors different from each other;

radiating the illumination light to said first to third image display elements; and causing said first to third image display elements to display an image according to an input video signal and the illumination light.

10. The projector according to claim 1, wherein a color of the first light is equal to a color of the second light.

11. The projector according to claim 1, wherein a color of the first fluorescence is yellow, a color of the second fluorescence is yellow and a color of the third light is blue.

12. The projector according to claim 1, wherein:

said light separation optical system generates both a first red light and a first green light from the first light and generates both a second red light and a second green light from the second light;

the first red light enters said first image display element;

the first green light and the second red light enter said second image display element; and the second green light and the third light enter said third image display element alternately.

13. The projector according to claim 1, wherein the first light, the second light, and the third light each comprise a different type of light.

14. The projector according to claim 1, wherein one of the first light, the second light, and the third light comprises a different type of light than the other two of the first light, the second light, and the third light.

15. The projector according to claim 1, wherein the second light source includes an annular region on a fluorescent wheel irradiated with an excitation light, the annular region being equally divided into a first region and a second region, and wherein the first region and the second region, a yellow fluorescent body and a reflection plate are provided alternately.

16. The projector according to claim 1, wherein the second light source includes a laser light source and a dichroic mirror, and wherein the dichroic mirror reflects the excitation light from the laser light source toward a fluorescent wheel.

17. The projector according to claim 1, wherein the second light source outputs blue light and yellow light alternately.

18. The projector according to claim 1, wherein the second light source includes a plurality of laser light sources and a plurality of dichroic mirrors, and wherein the dichroic mirrors reflect the excitation light from the laser light sources toward a fluorescent wheel.

19. The projector according to claim 18, wherein the second light source includes an annular region on the fluorescent wheel irradiated with an excitation light, the annular region being equally divided into a first region and a second region, and wherein the first region and the second region, a yellow fluorescent body and a reflection plate are provided alternately.

* * * * *